Nov. 28, 1950
N. MARCHAND
2,531,453
RADIO BEACON SYSTEM
Filed Dec. 14, 1945
2 Sheets-Sheet 1
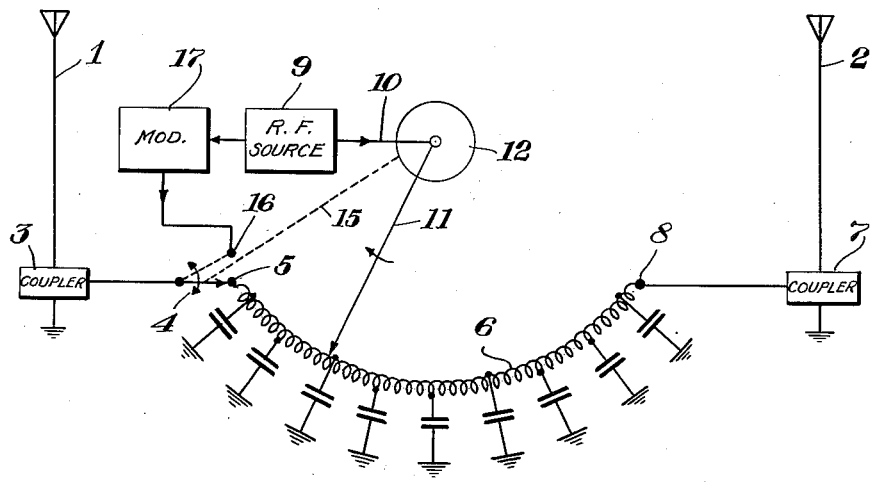
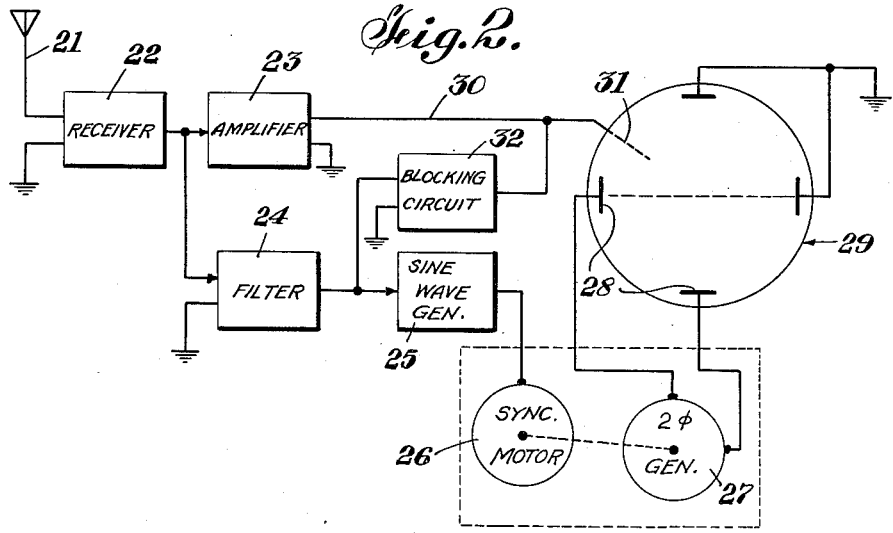
INVENTOR.
NATHAN MARCHAND
BY
R P Morris
ATTORNEY

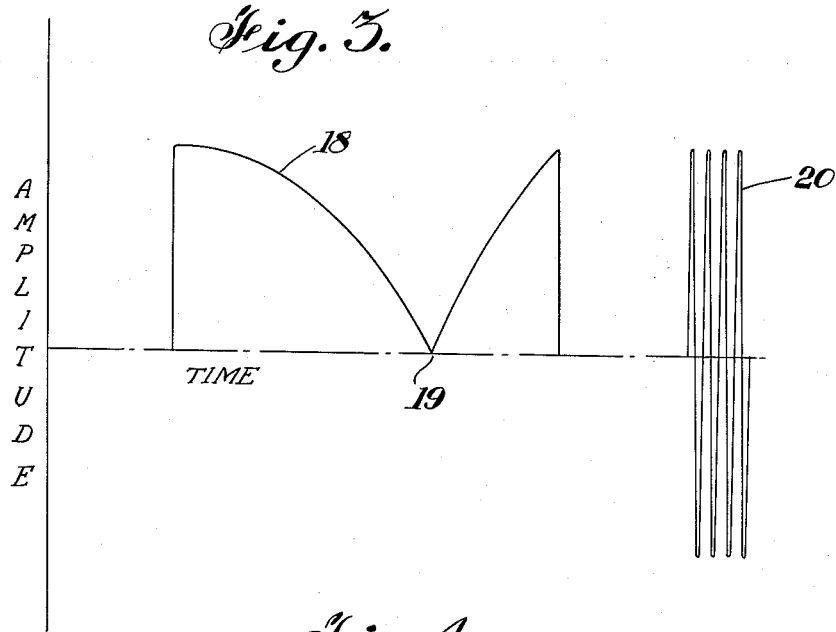
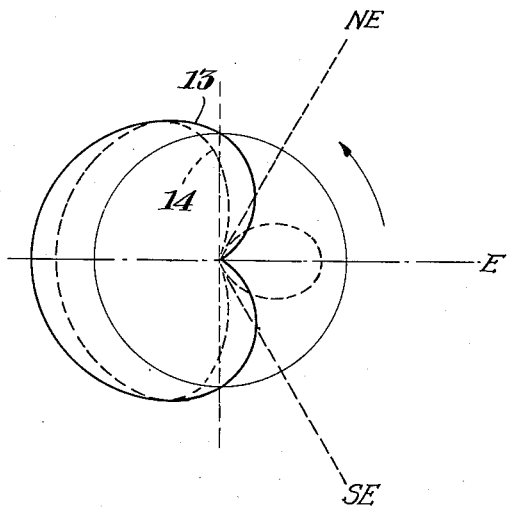

Patented Nov. 28, 1950

2,531,453

UNITED STATES PATENT OFFICE 2,531,453

RADIO BEACON SYSTEM

Nathan Marchand, New York, N. Y., assignor to Federal Telephone and Radio Corporation, New York, N. Y., a corporation of Delaware Application December 14, 1945, Serial No. 635,057

5 Claims. (Cl. 343—107)

This invention relates to radio beacons and more particularly to radio beacons adapted for long range navigation systems.

Direction finding systems have been proposed (see my copending application, Serial No. 553,562, filed September 11, 1944) wherein the received directive pattern is controlled by controlling the phase of energy received from two spaced antenna units, the phase shifting being accomplished by regular movement of a contact arm or the like over a transmission line.

According to this invention, I provide a radio beacon in which the direction of transmission of a radiation pattern is controlled in a cyclic manner by shifting the phase of energization of two antenna units relative one to the other. The antennas are coupled in such a manner that, when the shifting unit is at the central position, the two antennas will be energized in phase opposition so that a null will be produced in the radiation pattern directly in line with the center line in the antenna. By shifting the phase, this null line may be shifted throughout a predetermined angle. Means is provided cyclically to shift the phase to sweep the directional indicating null throughout the predetermined angle. This directive cycle is repeated at regularly spaced intervals and in the interval defined by the space between said intervals an omnidirectional characteristic synchronizing signal is transmitted. In the receiver equipment both the energy indicated by the directional null and by the synchronizing signal is received. The synchronizing signal is separated from the received energy and used to control the sweep of an oscillograph or other indicating apparatus. The directive signal is applied to the indicating apparatus so as to produce an indication of the amplitude of the received energy so that the directive null will be made apparent. Because of the synchronous operation of the receiving equipment, the null will appear at an angle on the screen of the indicator corresponding to the direction line from the receiver to the beacon station. Thus a craft will be enabled to follow a directive line to the beacon along a course. The frequency may be relatively low for longer range operation so that the phase shifting transmission line may be in the form of concentrated assimilation of a transmission line, for example, made up of an inductance shunting to ground by capacitances at regular intervals.

It is an object of my invention to provide a radio beacon system including means for transmitting a pattern having a predetermined variable directive characteristic during regularly repeated spaced cyclic intervals and means for transmitting an omnidirectional synchronizing signal during the periods intermediate said cycles.

It is another object of my invention to provide a receiver for cooperation with the radio beacon system defined above which will utilize the synchronizing signal to control a directional indicating system and the energy received from the cyclic pattern to produce the directional indications.

It is a further object of my invention to provide a system wherein energy may be cyclically transmitted in a directive null pattern by means of a regularly repeated phase shifting operation with respect to energy fed to spaced antennas and to transmit a synchronizing signal modulated energy in an omnidirectional pattern intermediate the transmission of the cyclic directive pattern.

It is a still further object of my invention to provide a receiving system for use with a radio beacon which transmits a cyclically repeated directive pattern and separate synchronizing signals wherein the synchronizing signals are used to synchronize the directive position of indicating means on said indicator and the directive pattern energy is used to produce indications of the direction line toward the beacon.

It is a still further object of my invention to provide a simple form of radio beacon system for use with relatively low frequencies and for long range operation.

While I have outlined above the broad features and objects of my invention, a better understanding of my invention and the objects and features thereof may be had from the particular description of an embodiment thereof made with reference to the accompanying drawings, in which:

Fig. 1 is a schematic diagram of a radio beacon transmitter incorporating the features of my invention;

Fig. 2 is a schematic wiring diagram partly in block of a receiver for use with the transmitter of Fig. 1;

Fig. 3 is a graph illustrating the directive transmitting pattern and the synchronizing signal; and Fig. 4 is a diagram illustrating the variations in the null pattern with variations in phasing of the energy supplied to the beacon antennas.

Turning first to Fig. 1, the transmitter comprises essentially two spaced antennas 1 and 2. These antennas may be of any desired type and are spaced apart preferably a distance in space of about 90 electrical degrees. Antenna 1 is coupled through impedance matching coupler 3 and switch 4 to the terminal 5 of a half wave artificial line 6. Antenna 2 is coupled through impedance matching coupler 7 to the opposite terminal 8 of artificial transmission line 6. A source of radio frequency energy 9 is coupled through line 10 and rotatable arm 11 to artificial transmission line 6. A motor 12 serves continuously to rotate or to oscillate line 6. Consequently, the radio frequency energy from source 9 is fed in variable phase relationship to antennas 1 and 2. Thus, as arm 11 rotates the pattern produced by radiation from antennas 1 and 2 may vary as shown in Fig. 4. Solid line curve 13 of Fig. 4 illustrates the coupling when the phase relationship is such as to produce a cardioid pattern having a single null in the direction E. When the arm is traversed a different distance, a dotted line pattern of the type illustrated in Fig. 4 will be produced as shown at 14 having two nulls at opposite angular positions indicated at NE and SE. Thus as arm 11 sweeps across the transmission line, the null positions will be varied through a predetermined arc.

After arm 11 has traversed a predetermined arc across transmission line 6, arm 11 no longer is in contact with transmission line 6. At this time, motor 12 through the medium of a mechanical coupling 15 serves to move switch 4 from terminal 5 up to a terminal 16. In this position, energy from source 9 is fed through modulator 17 and terminal 16 only through the medium of switch 4 so that an omnidirectional pattern is transmitted. This omnidirectional pattern is modulated with some predetermined signal as for example 500 cycle tone in modulator 17. As arm 11 continues to rotate, it again comes in contact with transmission line 6 repeating the directive cycle at which time switch 4 is again moved into contact with terminal 5.

The energy during a transmitting cycle as received at a receiving indicator may be represented, for example, by the curves shown in Fig. 3. In this figure, the directive received envelope is indicated at 18 having a null in a predetermined time position representative of the angular position of the receiver with respect to the beacon. As shown, the null point 19 is approximately two-thirds of the directive cycle from one end thereof. After the directive cycle represented by curve 18 has been transmitted, and an omnidirectional pulse 20 modulated with the tone modulating frequency is transmitted, it will be understood that the null position 19 of curve 18 represents the direction of the receiver with respect to the transmitting beacon while the synchronizing signal serves to synchronize the indicator with the beacon so that the angle will be correctly indicated.

Turning to Fig. 2, a simple diagram of a receiver for use with the beacon of Fig. 1 is illustrated. In this system energy from the beacon is received on antenna 21 and detected in receiver 22. The output of receiver 22 is divided into two paths, one path going to amplifier 23 while the other path for the synchronizing signal passes through a filter 24. The filter is arranged to pass only the pulse modulating frequency, for example, the 500 cycle tone. This synchronizing signal is then applied to sine wave generator 25 to produce a sine wave synchronized with the rotation indicated by the beacon signals. The sine wave generator may be of any type, for example a relaxation oscillator, provided with a suitable filter to produce a sine wave indication. The output of sine wave generator 25 may then operate a synchronous motor 26 which in turn operates two-phase generator 27. The energy from two-phase generator 27 may be applied to the deflecting electrodes 28 of an oscilloscope indicator 29 to produce a rotation of the beam of the scope synchronized with the radio beacon. The other received energy is applied over amplifier 23 and line 30 to a control grid 31 of indicator 29. Amplifier 23 is preferably arranged so that grid 31 will be energized only when the received signal energy substantially drops to a null value. In order to prevent the synchronizing tone signals from affecting grid 31, a blocking circuit 32 is provided coupled to the output of filter 24 serving to block grid 31 whenever synchronizing signals are being received. It will be apparent that grid 31 will serve to permit the beam to produce an indication only when the null signal is received so that the indications on the screen will correspond in angular position with the null of the directive pattern.

While I have described my invention in connection with a specific particular example, it is clear that other forms of invention may be provided as desired. Furthermore, many types of receiving indicators will readily occur to those skilled in the art. The ambiguities produced in the beacon system may be overcome by the use of a second similar beacon arranged at right angles thereto if so desired. Such second system may take a generally similar form to the sense corrected receiver illustrated in my aforesaid application, Serial No. 553,562. However, the various modifications are not necessary to an understanding of the invention and for this reason have not been described in detail.

It should be distinctly understood that the description given herewith is made merely by way of illustration and is not to be considered as a limitation on my invention as set forth in the objects thereof and in the appended claims.

I claim:

1. A radio beacon comprising a pair of antennas spaced apart substantially a half wavelength at the operating frequency, a phase shifting means coupled between said antennas to shift the relative phase of energy supplied to said antennas, a source of energy at said operating frequency, coupling means for coupling said source of energy to said antennas through said phase shifting means, means for cyclically adjusting said phase shifting means at regularly recurrent intervals to vary the phase energization of said antennas, a modulator coupled to said source to provide a predetermined synchronizing signal modulation of said energy, and means for coupling said modulator to one only of said antennas intermediate the cycles of said cyclic adjustment.

2. A radio beacon comprising a pair of radiator means spaced apart substantially a half wavelength at the operating frequency, a phase delay line substantially electrically a half wavelength long coupled between said radiator means, a source of energy of said operating frequency, coupling means for coupling said source of energy to said phase delay line, means for cyclically adjusting said coupling means to vary the phase energization of said radiator means, a modulator coupled to said source to provide a predetermined signal modulation of said energy, and means for coupling said modulator to one only of said antennas intermediate the cycles of said cylic adjustment.

3. A radio beacon system comprising a pair of antennas spaced apart substantially a half wavelength at the operating frequency, a phase delay line substantially electrically a half wavelength long coupled between said antennas, a source of energy of said operating frequency, coupling means for coupling said source of energy to said phase delay line, means for cyclically adjusting said coupling means to vary the phase energization of said antennas to transmit said energy in a directive beacon pattern, a modulator coupled to said course to provide a predetermined synchronizing signal modulation of said energy, means for coupling said modulator to one only of said antennas intermediate the cycles of said cyclic adjustment, receiver means for receiving the energy from said transmitter, means for separating said synchronizing signals and said directive beacon pattern energy, an indicator, means for synchronizing said indicator in response to said synchronizing signals, and means for applying said received energy to said indicator to provide beacon directive indications.

4. A beacon system according to claim 3 further comprising blocking means in said receiver means responsive to said received synchronizing signals for blocking said means for applying during reception of said synchronizing signals.

5. A beacon system according to claim 3 wherein said indicator comprises an oscilloscope having means for producing an electron beam, and said synchronizing means comprises means for rotating the beam of said oscilloscope in synchronism with the cyclic adjustment of said coupling means.

NATHAN MARCHAND.

REFERENCES CITED

The following references are of record in the file of this patent:

UNITED STATES PATENTS

| Number | Name | Date |
| --- | --- | --- |
| 1,135,604 | Meissner | Apr. 13, 1915 |
| 1,359,979 | Franklin | Nov. 20, 1920 |
| 1,988,006 | Greig | Jan. 15, 1935 |
| 2,368,318 | Müller | Jan. 30, 1945 |
| 2,394,157 | Earp | Feb. 5, 1946 |
| 2,407,169 | Loughren | Sept. 3, 1946 |
| 2,407,659 | Fuchs | Sept. 17, 1946 |
| 2,420,605 | McConnel | May 13, 1947 |
| 2,449,174 | O'Brien | Sept. 14, 1948 |

FOREIGN PATENTS

| Number | Country | Date |
| --- | --- | --- |
| 317,826 | Great Britain | May 29, 1930 |